(12) United States Patent
Maruyama (10) Patent No.: US 6,195,428 B1
(45) Date of Patent: Feb. 27, 2001

(54) DATA TRANSMISSION APPARATUS HAVING ABBREVIATED DIALING FUNCTION

(75) Inventor: Tomoko Maruyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/082,111

(22) Filed: May 20, 1998

(30) Foreign Application Priority Data

May 22, 1997 (JP) ..................................... 9-132296

(51) Int. Cl.⁷ ................................................. H04M 11/00
(52) U.S. Cl. ..................................... 379/356; 379/100.14
(58) Field of Search ........................ 379/100.14, 100.17, 379/355, 354, 356; 358/440

(56) References Cited

U.S. PATENT DOCUMENTS

| | | | | |
|---|---|---|---|---|
| 5,267,308 | * | 11/1993 | Jokinen et al. | 379/354 |
| 5,303,288 | * | 4/1994 | Duffy et al. | 379/355 |
| 5,357,245 | * | 10/1994 | Hagiwara | 379/100.14 |
| 5,428,676 | * | 6/1995 | Ogawa | 379/100.14 |
| 5,509,067 | * | 4/1996 | Murata | 379/355 |
| 5,568,546 | * | 10/1996 | Marutiak | 379/355 |

FOREIGN PATENT DOCUMENTS 8-204805  8/1996 (JP).

\* cited by examiner

Primary Examiner—Stella Woo
(74) Attorney, Agent, or Firm—Sidley & Austin (57) ABSTRACT

A facsimile allows registration of telephone numbers for speed dials and one-touch dials, and allows changing of telephone number registration easily and surely. By the facsimile, it is possible for the user to replace registered contents for the speed dial and the one-touch dial, while confirming the number of use or frequency by a use number confirmation key.

19 Claims, 8 Drawing Sheets

DATA TRANSMISSION APPARATUS HAVING ABBREVIATED DIALING FUNCTION

This application is based on Application No. 9-132296 filed in Japan, the contents of which are herein incorporated by reference.

BACKGROUND OF THE INVENTION

1. Field of the Invention

The present invention relates to a data transmission apparatus such as a telephone, a facsimile or a copying machine having a facsimile function. More specifically, the present invention relates to a data transmission apparatus having a function of specifying, using a telephone number, a destination of data transmission through telephone circuit.

2. Description of the Related Art

Conventionally, a facsimile (or a copying machine having a facsimile function or the like) has been used for transmitting an image to a distant location through a communication circuit such as a telephone circuit. In the field of facsimile, one having an abbreviated dialing (speed dialing) function and one-touch dialing function, similar to the functions of a telephone, has been known.

The speed dialing function refers to the function in which for a telephone number which is dialed frequently, a train of numbers shorter than the telephone number is allotted (registered), and by inputting the abbreviated train of numbers and a prescribed key, the desired telephone number is dialed. The one-touch dialing function refers to the function in which a telephone number which is dialed frequently is registered at a prescribed key, and by pressing the prescribed key, the desired telephone number is dialed. One-touch dialing function is convenient, as the desired telephone number can be dialed by even smaller key operation than the speed dialing function.

The speed dialing function and one-touch dialing function save the labor in inputting all the digits of the telephone number through ten keys and prevents error in inputting the telephone number, when a desired telephone number which is frequently used is dialed.

In the field of telephone and facsimile, one having the function of counting the number of uses of the speed dial or one-touch dial (hereinafter also referred to as used number counting function) has been known. The number of dials which can be registered for the speed dialing function or the one-touch dialing function is limited, and therefore when one facsimile machine is shared by a number of users, the number of registrable dials may be insufficient. Further, it is often the case that a dial which is no longer used is kept registered, as it is not clear who uses the speed dialing or one-touch dialing, preventing efficient use of speed dials and one-touch dials.

In order not to reduce effectively usable speed dials and one-touch dials, the function of counting the number of dialing or use is utilized to monitor the number of dialing. Depending on the number of uses, registration of a dial which is not used may be deleted. Registration of a speed dial which is frequently used may be changed to registration of a one-touch dial, and registration of a one-touch dial which is used less frequently may be changed to registration of a speed dial.

In the above described conventional facsimile having the speed dialing function and one-touch dialing function, a telephone number registered for the speed dialing function may be switched for registration of one-touch dialing, utilizing the used number counting function, in the following manner.

First, the used number counting function is activated, and state of use of the speed dials and one-touch dials are monitored for a certain period. Referring to the state of use of the dials, telephone numbers of which registration should be changed from the speed dialing function to the one-touch dialing function are specified, and the specified telephone numbers are written in a memorandum. Thereafter, registration of these telephone numbers for the speed dialing function are deleted, and the telephone numbers are registered, referring to the memorandum, for the one-touch dialing function.

Though it is possible to change registration through the above described procedure, such procedure for changing registration is time consuming, and there is a possibility of erroneous input by the user during the operation.

SUMMARY OF THE INVENTION

The present invention was made to solve the above described problem, and its object is to provide a data transmission apparatus allowing change of registration of telephone numbers in a simple and secure manner.

The above described object of the present invention is attained by a data transmission apparatus in accordance with a certain aspect, which includes a storing section for storing a plurality of telephone numbers in correspondence with a plurality of dial registering sections, a designating unit for designating first and second dial registering sections of said plurality of dial registering sections, and a first control unit controlling the apparatus such that a telephone number corresponding to the first dial registering section is stored in the storing section as a telephone number corresponding to the second dial registering section.

According to another aspect of the present invention, the data transmission apparatus includes a first registering unit receiving as an input a first telephone number for registering the first telephone number at a first registering section, a second registering unit receiving as an input a second telephone number for registering the second telephone number at a second registering section, and a replacement unit for replacing the first telephone number registered by the first registering unit with the second telephone number registered by the second registering unit, without inputting the first or second telephone number.

According to the present invention, it is possible to have a content of an abbreviated dial moved another abbreviated dial by a prescribed operation, without directly inputting the telephone number. Therefore, unlike the prior art, registration of a telephone number can surely and easily be changed without the necessity for a user to perform time consuming and troublesome operation, and without the possibility of any error during the operation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A facsimile, which is one embodiment of the present invention, will be described with reference to the figures.

Figure 1:
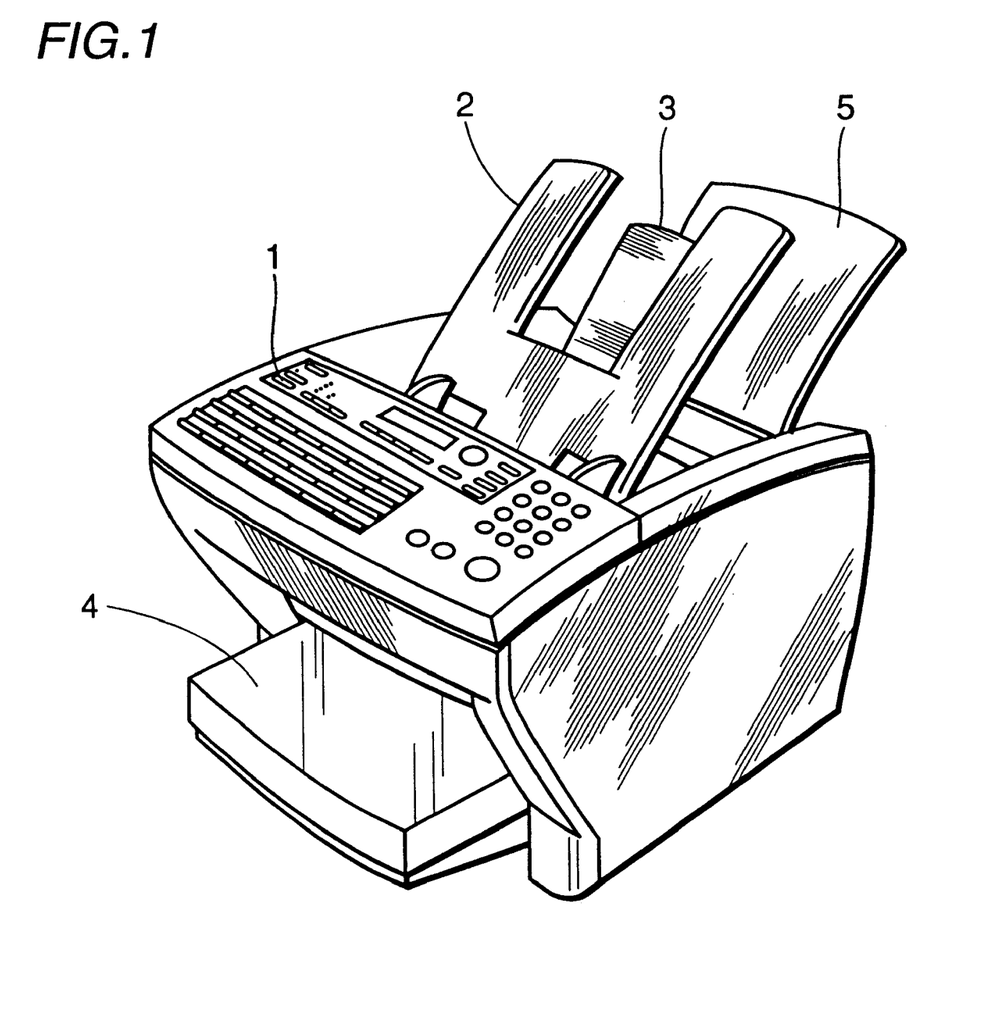
FIG. 1 shows an appearance of a facsimile in accordance with one embodiment of the present invention.

FIG. 1 shows an appearance of the facsimile in accordance with one embodiment of the present invention.

The facsimile has such an appearance as shown in FIG. 1. Through operation panel 1, a telephone number of a destination facsimile, operation mode of the facsimile and so on are input. When a user presses a start key 16 (see FIG. 2) on operation panel 1, images of originals on an original feed tray 2 are optically read one by one, and photo-electrically converted image data are transmitted to the destination facsimile through a telephone circuit. Originals of which images have been read are discharged one by one to an original discharge tray 3.

Receiving transmitted image data, sheets of recording paper are fed from a recording paper feed tray 4, and images are printed on the sheets of recording paper based on the received image data. The printed sheets are discharge one by one to a recorded sheet discharge tray 5.

Figure 2:
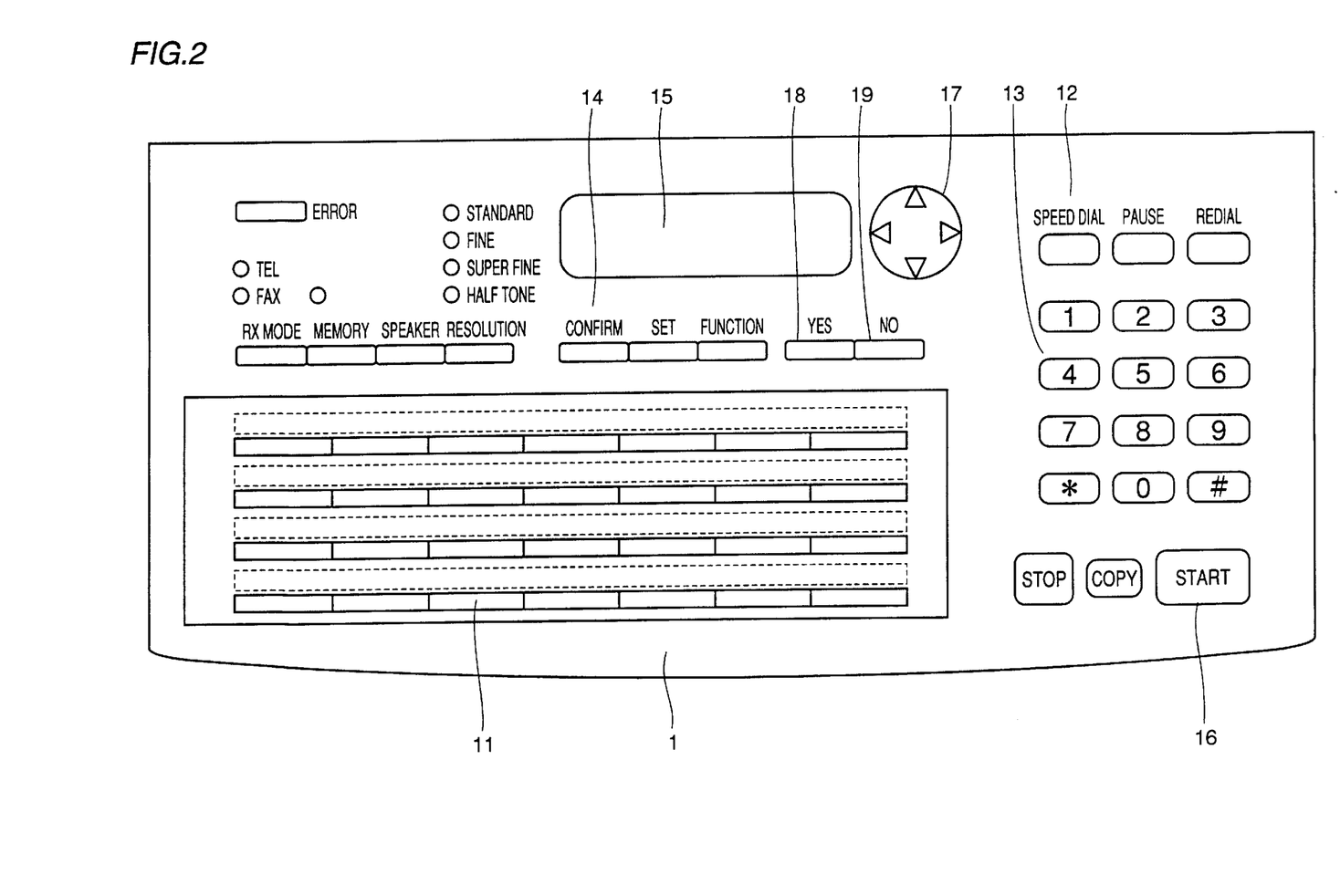
FIG. 2 is a plan view showing a structure of an operation panel 1.

FIG. 2 is a plan view showing the structure of operation panel 1.

Referring to FIG. 2, operation panel 1 has a one-touch dial key 11 and an speed dial key 12, and one-touch dialing function and speed dialing function are allotted to these keys, respectively. When one-touch dial key 11 is pressed, or when speed dial key 12 and a ten key 13 (for inputting a numeral set at the time of registration) are pressed, the destination telephone number which is registered in advance, is dialed. For one-touch dial key 11 and speed dial key 12, not only the destination telephone number but also the name of the destination, transmission speed of a modem and so on are registered.

Further, operation panel 1 has a use number confirmation key 14. When the use number confirmation key 14 is pressed, the number of uses of one-touch dial 11 and speed dial 12 are displayed on a display screen 15.

Further, operation panel 1 is provided with a start key 16 for starting transmission of an original, arrow keys 17, an YES key 18 and a NO key 19 used as necessary, in operations performed by using the above described keys.

Figure 3:
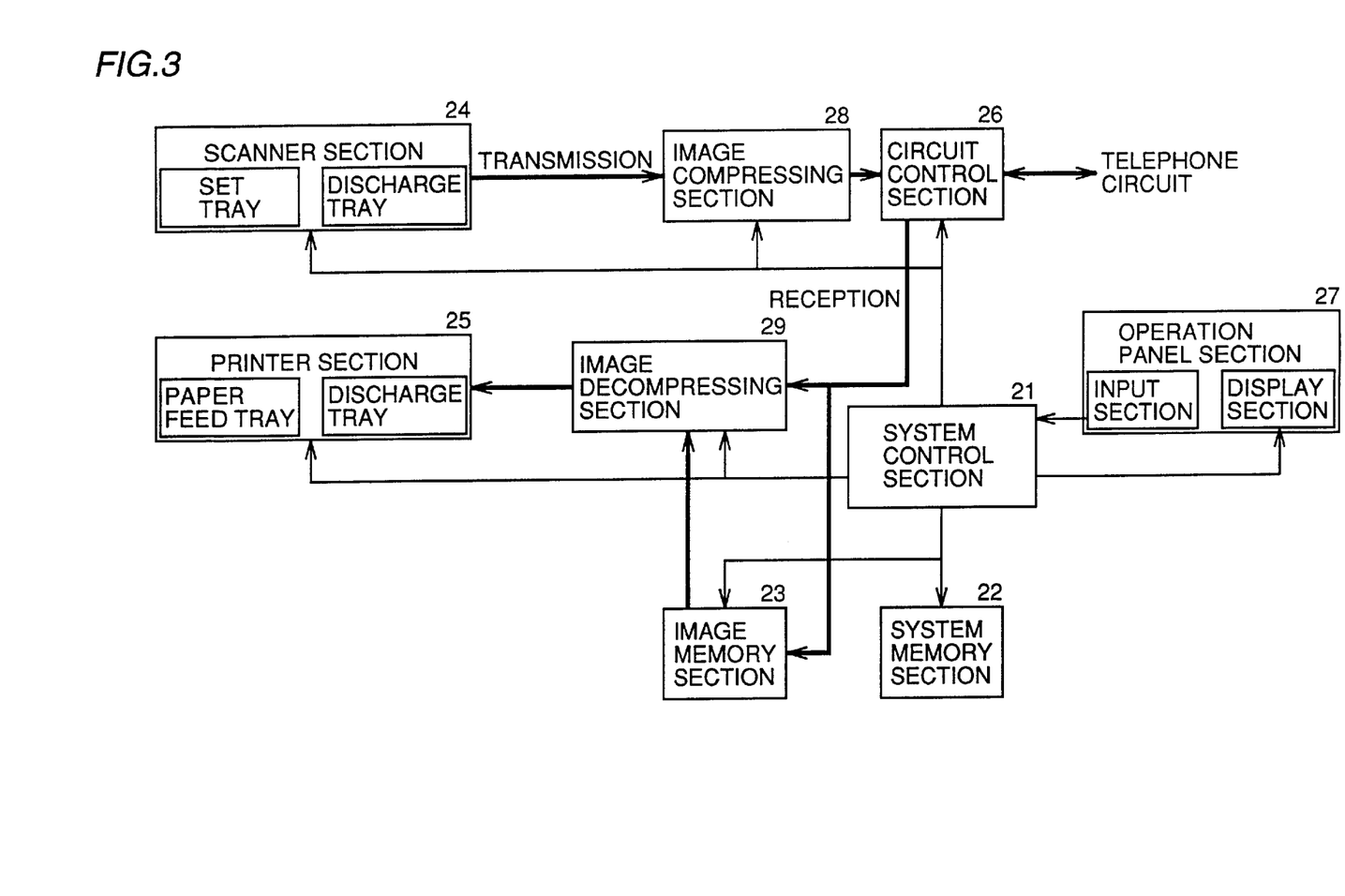
FIG. 3 is a block diagram showing a structure of a control section of the facsimile.

FIG. 3 is a block diagram showing a structure of the control section of the facsimile.

The control section of the facsimile includes a system control section 21 controlling the overall facsimile, a system memory section 22 for storing various settings and communication recording of the facsimile, an image memory section 23 storing compressed image data, a scanner section 24 controlling a scanner for reading an original, a printer section 25 controlling a printer for printing received images and reports, a circuit control section 26 for controlling an interface with a public circuit, an operation panel section 27 having an input section controlling user input, for controlling various displays, an image compression section 28 for compressing bit map data of an original read by the scanner section 24, and an image decompressing section 29 for decompressing and converting to bit map data, the received data input through circuit control section 26.

Registration of a telephone number or the like for the one-touch dial key 11 or speed dial key 12 is performed in the following manner. When a telephone number is input through ten keys 13 on operation panel 1 and one-touch dial key 11 or speed dial key 12 is pressed, the telephone number is registered for the pressed key. More specifically, by the system control section 21 shown in FIG. 3, the telephone number and the corresponding one-touch dial or the speed dial are stored in association with each other in system memory section 221.

One-touch dial and speed dial are provided, thus enabling dialing with smaller number of operations, and these are common in that they have the function of registering telephone numbers. Therefore, each of the one-touch dials and speed dials will be also referred to as "dial registering sections". Of the dial registering sections, one-touch dials enable dialing with smaller number of operations than speed dials. Therefore, it is preferred that a frequently used telephone number is registered for the one-touch dial.

Figure 4:
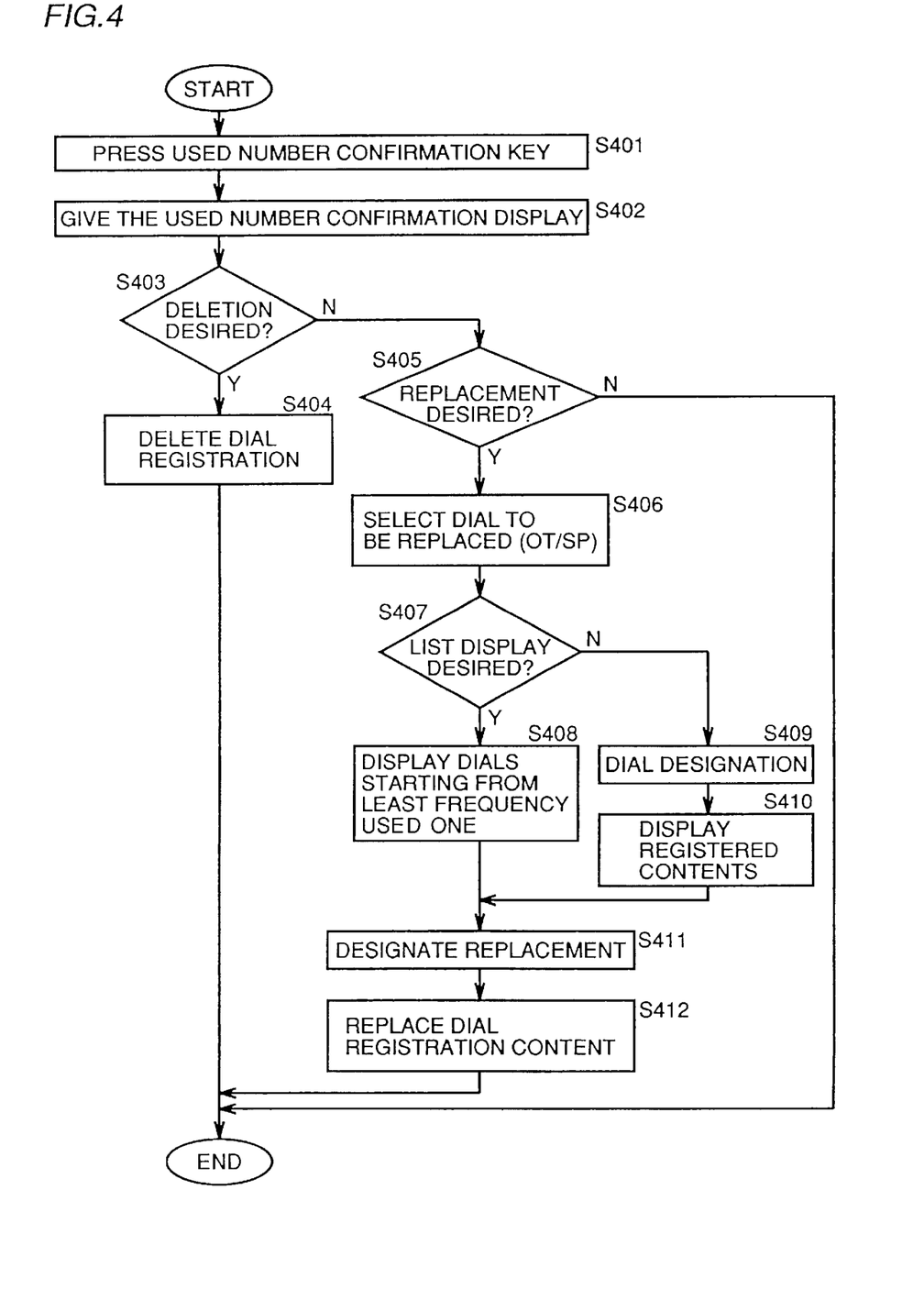
FIG. 4 is a flow chart showing control procedure at the time of replacement of dial registration.
Figure 5:
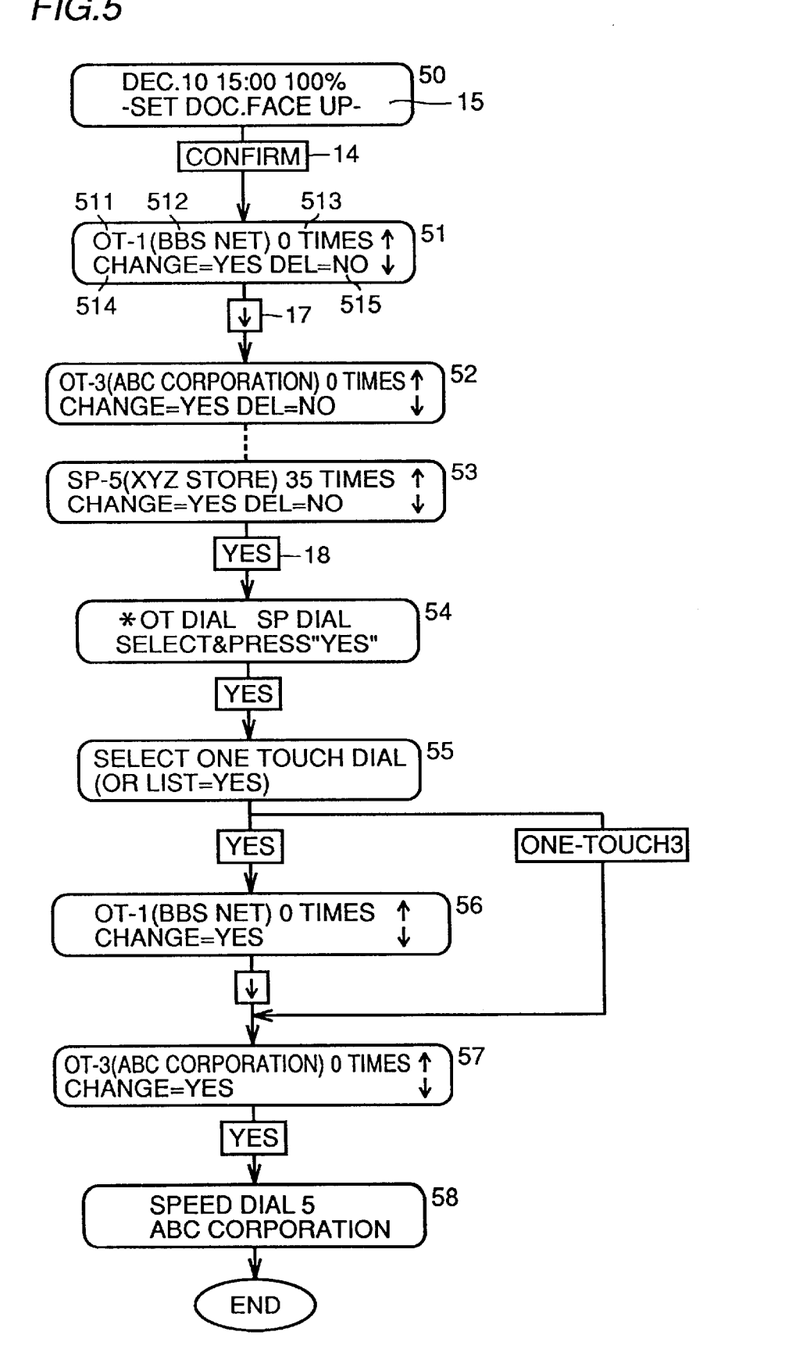
FIG. 5 shows displays given at the time of replacement of dial registration.

In system control section 21 of such a facsimile, control proceeds in accordance with the flow chart shown in FIG. 4, so that a dial registered for one-touch dialing is replaced by a dial registered for the speed dialing (hereinafter, also referred to as dial registration replacement), and displays such as shown in FIG. 5 are given on display screen 15 (see FIG. 2). At the time of dial registration replacement, operation is designated by an input through operation panel 1.

FIG. 4 is a flow chart showing the control procedure for dial registration replacement.

The speed dials and one-touch dials used for transmitting original image data are counted by the used number counting function and stored in system memory 22 (see FIG. 3).

At the time of dial registration replacement, first, in S401, pressing of used number confirmation key 14 (see FIG. 2) is detected. In S402, a display of used number confirmation (described later with reference to FIG. 5) is given on display screen 15. Here, displays are automatically given starting from those which are least frequently used, of the speed dials and one-touch dials. When the user presses an up key (see FIG. 2) of arrow keys 17, registered content of a telephone number which is second least frequently used is given. When the user presses a down key of arrow keys 17, registered content of a telephone number which is more frequently used is displayed.

In S403, whether deletion of registered content for the dial registration displayed on display screen 15 is selected or not is determined. If deletion of the registered content is selected (YES in S403), the registered content displayed on display screen 15 is deleted from the dial registering section in system memory section 22 (see FIG. 3) in S404, and the present routine is terminated.

If deletion of the registered content is not selected (NO in S403), whether dial registration replacement is selected or not is determined in S405. If dial registration replacement is not selected (NO in S405), the present routine is terminated. If dial registration replacement is selected (YES in S405), the flow proceeds to S406. In S406, content of dial registration displayed in S402 is detected, and which of the speed dial and one-touch dial is selected by the user for the dial registration of which registered content is to be replaced, is detected.

In S407, whether a list of speed dials or one-touch dials selected in S406 is to be displayed or not is determined, based on an input. When display of the list is designated by an input (YES in S407), the content of dial registration of the speed dial or the one-touch dial selected in S406 is displayed in the form of a list, starting from the one which is least frequently used. Similar to the displays given in S402, by the operation of arrow key 17 (see FIG. 2), a dial which is the object of dial registration is selected from the display, and thereafter, the flow proceeds to S411.

When there is no input for displaying the list (NO in S407), a dial designated by the user is input in S409, content of registration is displayed in S410, and thereafter, the flow proceeds to S411.

In S411, designation for dial registration replacement is input, and in S412, the content of dial registration displayed in S402 is replaced by the content of dial registration displayed in S408 or S410. After this process, the routine is terminated.

Based on the control described above, the following displays are given.

FIG. 5 shows displays given at the time of dial registration replacement. Here, displays given when registered content for a speed dial No. 5, which is frequently used, and registered content for a one-touch dial No. 3, which is not frequently used, are replaced, will be described. For speed dial No. 5, "XYZ STORE" as name of destination, "06-987-6543" as telephone number of the destination and "LOW" as communication speed of a modem are registered. For one-touch dial No. 3, "ABC CORPORATION" as name of the destination, "03-1234-5678" as the telephone number of the destination, and "HIGH" as transmission speed of a modem are registered.

Generally, a display 50 is given on display screen 15 of operation panel 1 (see FIG. 2). When use number confirmation key 14 is pressed by the user, registered content is displayed starting from dial registration which is least frequently used, such as display 51 (which corresponds to steps S401 and S402 of FIG. 4).

In the display 51 given on the display screen 15, "OT-1" which is element 512 of the display represents one-touch dial No. 1. "BBS NET", which is an element 512 of the display represents the name of the destination of the telephone number registered for the one-touch dial No. 1. "0 times" which is element 513 of the screen represents the number of use of one-touch dial No. 1. "CHANGE=YES" which is element 514 of the display represents that when the user presses YES key 18, dial registration replacement is designated. "DEL=NO" which is element 515 of the display represents that dial registration is canceled or deleted, when the user presses NO key 19.

When the user presses an arrow key 17 with the display 51 given on display screen 15, then a display 52 of the second least frequently used dial (or of the same frequency as the last one) is given. By pressing the arrow key 17 several times, the display 53 is given which represents the number of use of speed dial No. 5, which is the object of the user, so that the user can confirm the number of use of the speed dial No. 5. Here, "SP-5" of display 53 represents speed dial No. 5.

In a state where the number of use of speed dial No. 5, which is the object of the user, is given in this example, when the user presses YES key 18, it is confirmed that the registration content of speed dial No. 5 should be changed, and display 54 is given (which corresponds to S406 of FIG. 4).

With the display 54 given, whether a speed dial or a one-touch dial is to be designated for replacement of registration content with speed dial No. 5 is selected, by using left/right direction keys of arrow keys 17 and YES key 18 representing establishment. Here, with the display 54 given, YES key 18 is pressed, so that one-touch dial is selected.

Thereafter, display 55 is given, which asks the user to select whether direct pressing of a one-touch dial or display of the list of one touch-dials should be given. When YES key 18 is pressed here, display 56 is given. In the similar manner as for displays 52 and 53, by pressing down key of arrow keys 17 several times, display 57 is given (corresponds to the processing when the answer is YES in step S407 of FIG. 4). Then one-touch dial No. 3 is pressed with the display 55 given, and the display 57 is given directly (which corresponds to the process when the answer is NO in S407 of FIG. 4). Whether the one-touch dial is to be directly pressed or the list of one-touch dials is to be displayed when the display 55 is given may be selected dependent on whether the user knows well the dial of which content of registration is to be replaced.

Display 57 represents number of use of one-touch dial No. 3, which is the object of the user. When YES key 18 is pressed, it is established that the registration content of on-touch dial No. 3 is to be replaced, and by display 58, it is confirmed that the registration content should be replaced by that of speed dial No. 5, and the present setting is completed.

In this manner, the registered content of speed dial No. 5, that is, the name "XYZ STORE" of the destination, the telephone number "06-987-6543" of the destination and transmission speed "LOW" of the modem are replaced by the registration content of one-touch dial number 3, that is, the name "ABC CORPORATION" of the destination, the telephone number "03-1234-5678" of the destination and transmission speed "HIGH" of the modem. Accordingly, the name "ABC CORPORATION" of the destination, the telephone number "03-1234-5678" of the destination and transmission speed "HIGH" of the modem are registered for speed dial No. 5, and the name XYZ STORE" of the destination, the telephone number "06-987-6543" of the destination and transmission speed "LOW" of the modem are registered for one-touch dial No. 3.

In this manner, it becomes possible for the user to surely and easily change registration of telephone numbers for the speed dials and one-touch dials, without the necessity of switching two telephone numbers through troublesome and time consuming operation, without any error in such operation.

Figure 6:
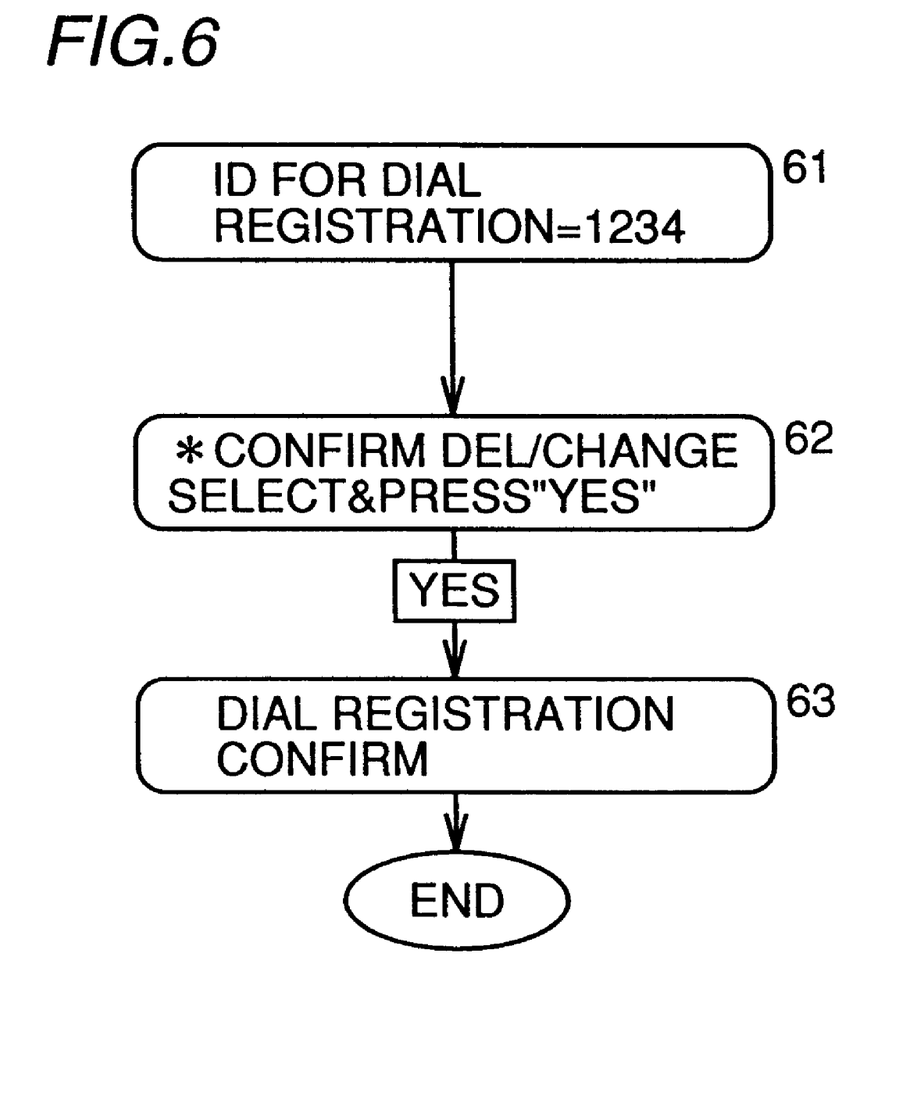
FIG. 6 is an illustration showing setting of an authorization ID for changing dial registration.

It is possible to have an authorization ID input when dial registration is to be changed (when dial registration is to be deleted or replaced). The authorization ID is set in a manner as shown in FIG. 6. Change of dial registration using the authorization ID is performed in accordance with the flow chart of FIG. 7, and displays such as shown in FIG. 8 are given in this process.

FIG. 6 is an illustration of setting of the authorization ID for changing dial registration.

When input of an authorization ID is designated, referring to display 61, it is possible to set the authorization ID for dial registration to be "1234", for example. Display 62 allows setting of items which are not accessible, when the authorization ID is not correctly input. Here, it is assumed that the following settings 1 and 2 are not accessible. Setting 1 is confirmation of the number of use, deletion and replacement of the registration content. Setting 2 is deletion and replacement of registration content. In display 62, "*" is moved to the left/right by pressing left/right direction keys of arrow key 17 (see FIG. 2) so as to select either "CONFIRM" (setting 1) and "DEL/CHANGE" (setting 2), and the selection is established by pressing YES key 18. By display 63, it is confirmed that the item which is not accessible if the authorization ID for dial registration is not correctly input is "CONFIRM" (setting 1), and in this manner, setting of the authorization ID is completed.

Figure 7:
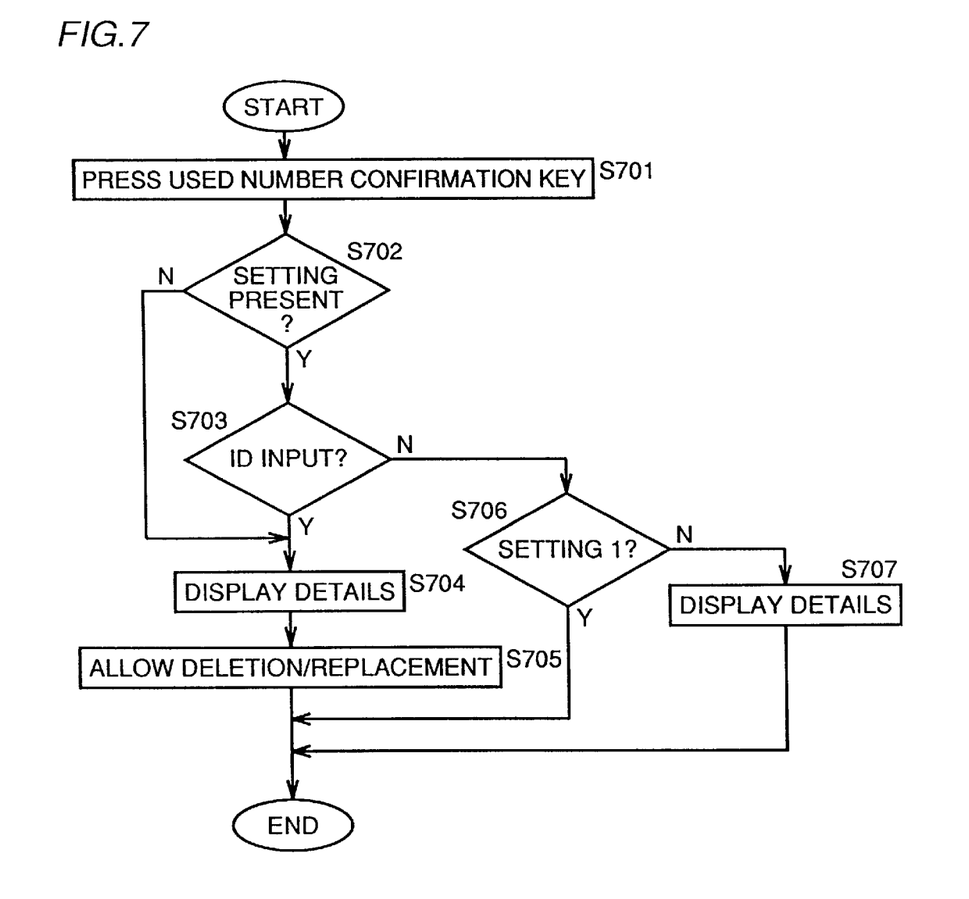
FIG. 7 is a flow chart showing control procedure at the time of dial registration replacement, when it is possible to set an authorization ID for changing dial registration.
Figure 8:
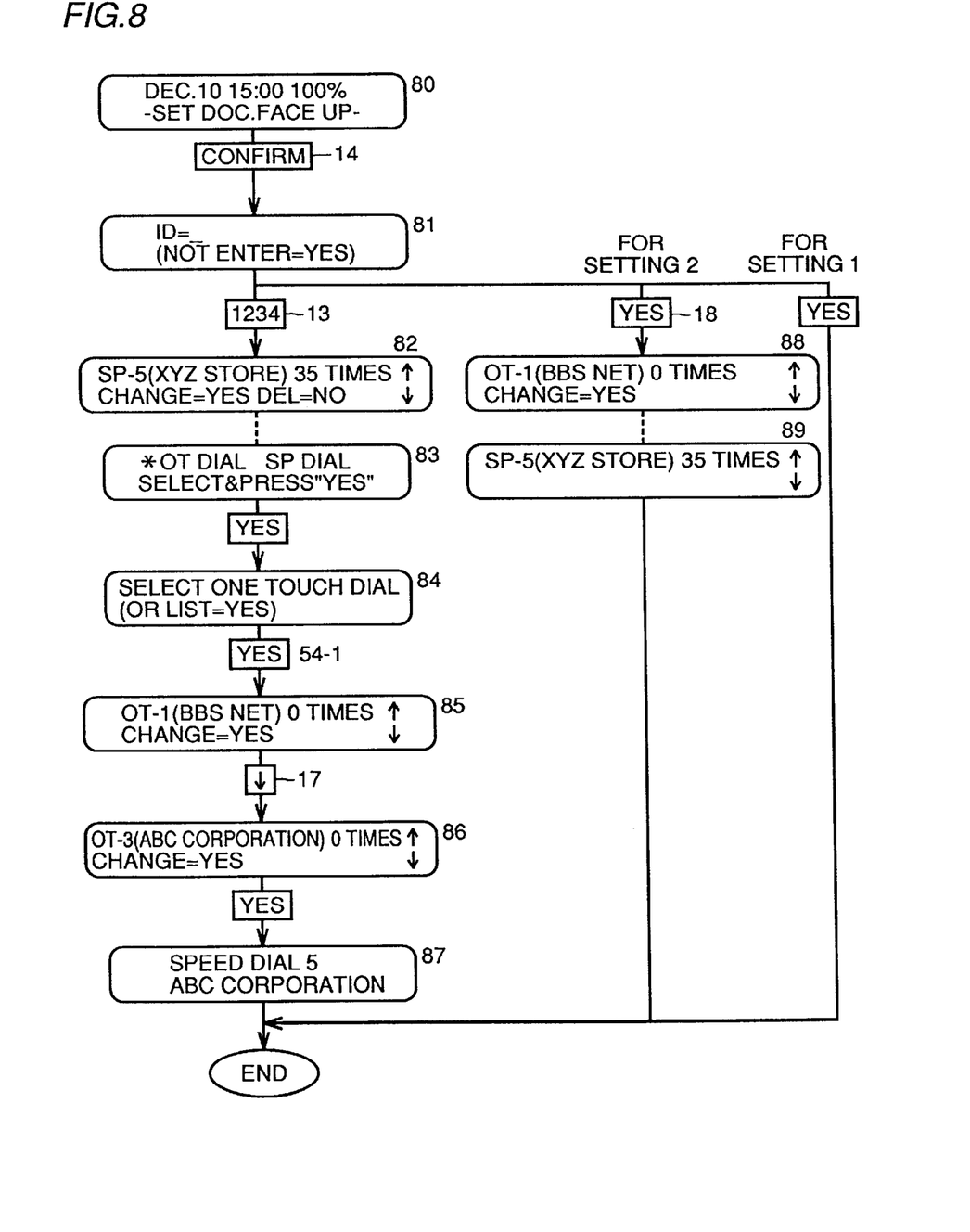
FIG. 8 is an illustration showing displays given at the time of dial registration replacement, when it is possible to set an authorization ID for changing dial registration.

FIG. 7 is a flow chart showing control procedure for dial registration replacement, when it is possible to set the authorization ID for changing dial registration. The process shown in FIG. 7 corresponds to the process of FIG. 4 with some operations resulting from authorization ID added. Details of the process other than the portion related to the authorization ID are the same as those described with reference to FIG. 4.

When the number of use of the dial registration is confirmed where it is possible to set the authorization ID, first, pressing of the used number conformation key 14 (see FIG. 2) is detected in S701. In S702, whether or not the authorization ID is set or not is determined. If the authorization ID is not set (NO in S702), the number of use of speed dials and one-touch dials are displayed in S704. Deletion and replacement of dial registration is allowed in S705, and the user deletes or replaces dial registration. Thereafter, the present routine is terminated. When the authorization ID is set (YES in S702), whether the authorization ID is correctly input or not is determined in S703. If the authorization ID has been input correctly (YES in S703), the control proceeds to steps S704 and S705, in the similar manner as when authorization ID is not set.

If the authorization ID is not correctly input (NO in S703), whether setting 1 has been selected for authorization ID or not is determined in S706. When setting 1 has been selected (YES in S706), the present routine is terminated. If setting 1 is not selected (that is, when setting 2 has been selected) (NO in S706), the number of use of the speed dials and one-touch dials are given in S707, and the routine is terminated. In this case, it is impossible to delete or replace dial registration.

FIG. 8 shows displays given at the time of dial registration replacement when it is possible to set the authorization ID for changing dial registration. Displays shown in FIG. 8 include displays shown in FIG. 5 with displays related to the authorization ID added, and details of displays other than those related to the authorization ID are similar to those described with reference to FIG. 5.

Generally, display 80 is given on display screen 15 of operation panel 1 (see FIG. 2). When the user presses the use number confirmation key 14, display 81 is given, asking input of the authorization ID (which corresponds to S703 of FIG. 7). When the user correctly inputs the authorization ID through ten keys 13, the number of use of the registered dials are confirmed, and deletion or replacement of registered contents are performed as shown in displays 82 to 87. When YES key 18 is pressed at the time of input of the authorization ID (display 81), the process which can be performed by the user on the facsimile differs dependent on which of settings 1 and 2 is selected.

When setting 1 is selected and YES key 18 is pressed at the time of input of the authorization ID, the present routine is terminated without performing any of confirmation of the number of use of the registered dials, and deletion and replacement of the registration contents by the user (corresponds to the process when the answer is YES in step S706 of FIG. 7). When setting 2 is selected and YES key 18 is pressed at the time of input of the authorization ID, only the confirmation of the number of use of the registered dials is allowed for the user. After confirmation, the present routine is terminated (which corresponds to the process when the answer is NO in S706 of FIG. 7).

In this manner, by setting an authorization ID for changing dial registration, it becomes possible to manage the operation of the facsimile by a specific user, when the facsimile is shared by a number of users. Therefore, unnecessary deletion or replacement of registered contents for the dial registration by unspecified users can be prevented and hence the number of deletion/replacement of the registered contents for dial registration is not excessibly increased.

Though replacement between two registration dials have been described, it is possible to put in the contents of the dial registering section selected in step S408 or S410 to that dial registering section which is selected in step S402, in step S412 of FIG. 4.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transmission apparatus, comprising:
   a storage device for storing a plurality of telephone numbers in corresponding ones of a plurality of dial registration sections;
   designating means for designating, responsive to a first input by an operator, a first dial registration section and for designating, responsive to a second input from an operator, a second dial registration section, said first and second dial registration sections being selected from said plurality of dial registration sections; and
   first control means, responsive to said designating means, for controlling the apparatus to change a correspondence of a telephone number from said first dial registration section to said second dial registration section.

2. A data transmission apparatus according to claim 1, further comprising second control means, responsive to said designating means, for controlling the apparatus to change a correspondence of a telephone number corresponding to said second dial registration section to said first dial registration section.

3. The data transmission apparatus according to claim 2, wherein said first and second control means operate simultaneously.

4. A data transmission apparatus according to claim 1, wherein said designating means includes:
   display means for displaying a list of at least a portion of said plurality of dial registration sections, and
   selecting means, responsive to an input by an operator, for allowing an operator to select a desired dial registration section out of said displayed list.

5. A data transmission apparatus according to claim 1, further comprising deleting means, responsive to an input by an operator, for deleting a desired one of said plurality of telephone numbers.

6. The data transmission apparatus according to claim 5, wherein said deleting means operates only when an input ID number coincides with a stored number.

7. The data transmission apparatus according to claim 1, wherein said first control means operates only when an input ID number coincides with a stored number.

8. A data transmission apparatus according to claim 1, wherein said storage device stores a telephone number and name of a destination corresponding to the telephone number.

9. A data transmission apparatus according to claim 1, wherein said storage device stores a telephone number and a transmission speed corresponding to the telephone number.

10. A data transmission apparatus, comprising:

registering means for receiving as an input a plurality of telephone numbers including at least a first telephone number and a second telephone number and for registering the first telephone number and the second telephone number in first and second registration sections, respectively;

designating means for designating, responsive to a first input by an operator, said first registration section and for designating, responsive to a second input from an operator, said second registration section; and replacement means for replacing the first telephone number registered in said first registration section with the second telephone number registered in said second registration section;

wherein said first and second inputs by an operator do not include inputting one of the first and second telephone numbers.

11. A method of data transmission, comprising the steps of:

storing a plurality of telephone numbers in corresponding ones of a plurality of dial registration sections;

designating, based on a first action by an operator, a first dial registration section and designating, based on a second action by an operator, a second dial registration section, said first and second dial registration sections being selected from said plurality of dial registration sections; and a first changing step of changing, based on a result from said designating step, a correspondence of a telephone number from said first dial registration section to said second dial registration section.

12. A method of data transmission according to claim 11, further comprising a second changing step of changing, based on a result from said designating step, a correspondence of a telephone number from said second dial registration section to said first dial registration section.

13. The method of data transmission according to claim 12, wherein said first and second changing steps are performed simultaneously.

14. An apparatus, comprising:

a memory, having a plurality of sections, for storing a plurality of telephone numbers, each telephone number being stored in a corresponding section of said memory;

a first input device for receiving a first input from an operator to designate a first section of said memory;

a second input device for receiving a second input from an operator to designate a second section of said memory; and a control device, responsive to a signal from said first input device and a signal from said second input device, for changing a phone number stored in one of said first and second memory sections to a phone number stored in the other of said first and second memory sections.

15. An apparatus in accordance with claim 14, wherein said control device changes said phone number stored in said one of said first and second memory sections to said phone number stored in said other of said first and second memory sections and changes said phone number stored in said other of said first and second memory sections to said phone number stored in said one of said first and second memory sections.

16. An apparatus in accordance with claim 14, further comprising a display device for displaying the contents of at least a portion of said plurality of sections of memory.

17. An apparatus in accordance with claim 16, wherein at least one of said first input device and said second input device receive an input from an operator by said operator indicating a section of memory displayed on said display device.

18. An apparatus in accordance with claim 14, further comprising a removing device, responsive to a signal from one of said first input device and said second input device, for removing a phone number stored in the corresponding one of said first and second memory sections.

19. An apparatus in accordance with claim 14, further comprising a security device for receiving an inputted ID from an operator, for comparing said inputted ID with a stored value and for inhibiting operation of at least one of said control device and said removing device when said inputted ID and said stored value do not match.

* * * * *